(12) United States Patent
Zhou et al.

(10) Patent No.: US 10,592,257 B2
(45) Date of Patent: Mar. 17, 2020

(54) KERNEL MANAGEMENT METHOD, DEVICE AND COMPUTER PROGRAM PRODUCT

(71) Applicant: EMC IP Holding Company LLC, Houston, TX (US)

(72) Inventors: Yizhou Zhou, Chengdu (CN); Zhibin Zhang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 84 days.

(21) Appl. No.: 16/119,313

(22) Filed: Aug. 31, 2018

(65) Prior Publication Data

US 2019/0324762 A1 Oct. 24, 2019

(30) Foreign Application Priority Data

Apr. 20, 2018 (CN) .......................... 2018 1 0362445

(51) Int. Cl.
*G06F 9/44* (2018.01)
*G06F 9/445* (2018.01)
*G06F 8/71* (2018.01)
*G06F 8/65* (2018.01)

(52) U.S. Cl.
CPC ............... *G06F 9/445* (2013.01); *G06F 8/65* (2013.01); *G06F 8/71* (2013.01)

(58) Field of Classification Search
CPC ..... G06F 9/445; G06F 8/65; G06F 8/71; G06F 9/44536; G06F 9/44521; G06F 9/44505
USPC ......................................... 717/170
See application file for complete search history.

(56) References Cited

U.S. PATENT DOCUMENTS

| | | | | |
|---|---|---|---|---|
| 7,130,870 | B1 * | 10/2006 | Pecina | G06F 11/1433 |
| 8,825,995 | B2 * | 9/2014 | Lee | G06F 8/65 |
| | | | | 713/100 |
| 10,528,742 | B2 * | 1/2020 | Xia | G06F 8/656 |
| 2019/0213014 | A1 * | 7/2019 | Xia | G06F 9/4406 |

* cited by examiner

*Primary Examiner* — Anna C Deng
(74) *Attorney, Agent, or Firm* — Chamberlain, Hrdlicka, White, Wiliiams & Aughtry (57) ABSTRACT

Embodiments of the present disclosure relate to a method, device and computer program product for kernel management. The method comprises: receiving, from a server, a plurality of instances of a kernel module to be loaded into a kernel, the plurality of instances corresponding to a plurality of candidate versions, determining a current version of the kernel in response to the kernel being started or updated, and loading, to the kernel, an instance of the plurality of instances corresponding to the current version. Embodiments of the present disclosure may improve the security of the operating system, meet close-source requirement of a commercial operating system and also simplify the process of the kernel module referring to one or more APIs.

12 Claims, 7 Drawing Sheets

KERNEL MANAGEMENT METHOD, DEVICE AND COMPUTER PROGRAM PRODUCT

FIELD

The present disclosure generally relate to the field of operating system, and more specifically, to a method, device and computer program product for kernel management.

BACKGROUND

An operating system is a program for managing computer hardware and software resources. The kernel is a core component of the operating system. Kernel module refers to an interface (such as a drive) that the kernel of the operating system opens to the user for editing the kernel. Typically, operating systems (such as Linux, Mac OS X and so on) generally include a kernel and a kernel module.

Kernel module loading is a basic management function of the operating system. When the kernel is updated or started, it is necessary to load the kernel module corresponding to the current version of the kernel. Currently, some of the kernel modules distributed to the client are open-source, so the kernel modules may be updated on the client automatically or manually. However, for a commercial operating systems having confidential requirement, this kind of kernel management mechanism does not apply.

SUMMARY

Embodiments of the present disclosure provide a method, device and the corresponding computer program product for kernel management.

In general, in one aspect, the present disclosure provides a kernel management method. The method comprises: receiving, from a server, a plurality of instances of a kernel module to be loaded into a kernel, the plurality of instances corresponding to a plurality of candidate versions; determining a current version of the kernel in response to the kernel being started or updated; and loading, to the kernel, an instance of the plurality of instances corresponding to the current version.

In some embodiments, loading comprises: updating an application programming interface (API) table of the kernel module, wherein the API table comprises an address, in the kernel, of an API used by the kernel module.

In some embodiments, the API table further comprises the kernel and an address, in the kernel, of an API used by a further kernel module loaded to the kernel.

In some embodiments, the plurality of candidate versions correspond to a plurality of universal versions of the kernel, respectively, and the plurality of universal versions comprise the current version.

In some embodiments, the plurality of candidate versions are each encapsulated binary codes of kernel module.

In general, in one aspect, the present disclosure provides a kernel management method. The method comprises: generating a plurality of instances of a kernel module to be loaded into a kernel, the plurality of instances corresponding to a plurality of candidate versions; transmitting the plurality of instances to the client; and receiving a loading result from the client.

In general, in one aspect, the present disclosure provides an electronic device, comprising: at least one processing unit; and at least one memory coupled to the at least one processing unit and storing machine-executable instructions. The instructions, when executed by the at least one processing unit, cause the electronic device to perform a method, the method comprising: receiving, from a server, a plurality of instances of a kernel module to be loaded into a kernel, the plurality of instances corresponding to a plurality of candidate versions; determining a current version of the kernel in response to the kernel being started or updated; and loading an instance of the plurality of instances corresponding to the current version to the kernel.

In general, in one aspect, the present disclosure provides an electronic device, comprising: at least one processing unit; and at least one memory coupled to the at least one processing unit and storing machine-executable instructions. The instructions, when executed by the at least one processing unit, cause the electronic device to perform a method, the method comprising: generating a plurality of instances of a kernel module to be loaded into a kernel, the plurality of instances corresponding to a plurality of candidate versions; transmitting the plurality of instances to the client; and receiving a loading result returned from the client.

In general, in one aspect, the present disclosure provides a computer program product tangibly stored on a non-transient computer readable medium and including machine executable instructions which, when executed, cause the machine to perform the method according to one or more aspects of present disclosure.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

DETAILED DESCRIPTION OF EMBODIMENTS

Embodiments of the present disclosure will be described in greater detail with reference to the drawings. Although the drawings present the embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

A traditional kernel management system includes a server and a client, which may be interconnected via a TCP/IP interface or other interfaces.

Figure 1:
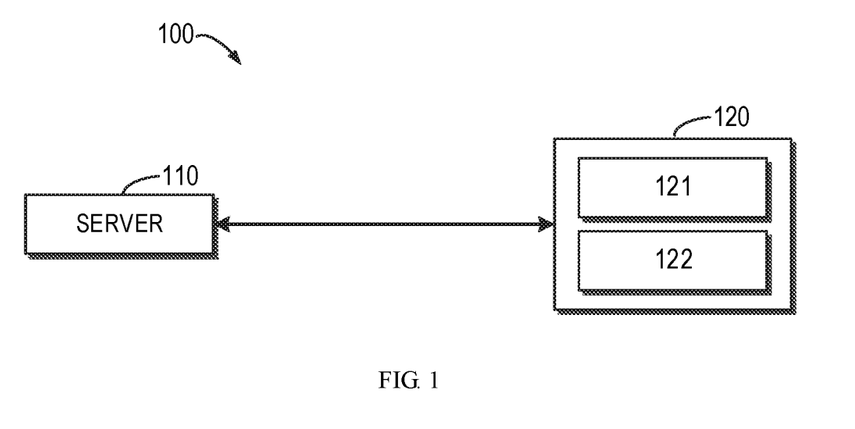
FIG. 1 illustrates a schematic diagram of an overall arrangement of a kernel management system in accordance with embodiments of the present disclosure.

FIG. 1 illustrates a schematic diagram of an overall arrangement of a kernel management system 100. As illustrated in FIG. 1, the kernel management system 100 includes a server 110 and a client 120, in which a kernel 121 and one or more kernel modules 122 are arranged.

In the traditional kernel management mechanism, when the kernel 121 of the client 120 is updated, the client 120 will load or update the kernel module 122 accordingly for the updated kernel 121. As operating systems, such as Linux, are all open-source, the user can write the source code of the kernel module 122 manually to complete the corresponding update of the kernel module 122. Alternatively, the user may also utilize a program architecture such as a dynamic kernel module support (DKMS) scheme to compile the source code of the kernel module 122 automatically to complete the corresponding update of the kernel module 122.

However, regardless of whether the user writes the source code of the kernel module manually or automatically, there is a possibility that the updated kernel module 122 does not apply to the kernel 121, which poses a certain threat to the system security. Secondly, as the kernel module distributed to the client is partially open-source, this kind of kernel management mechanism will be limited applicability for a commercial operating system having confidentiality (close-source) requirement. Moreover, in the traditional kernel management mechanism, the plurality of kernel modules 122 associated with the kernel 121 may refer to each other's APIs, which will require exporting the required APIs, which also results in the APIs being exposed.

To solve the above and other potential problems and drawbacks at least in part, embodiments of the present disclosure provide a scheme for managing a kernel. For the above problem, the scheme for managing a kernel of the present disclosure makes at least the following improvements: to prevent the user from writing the source code of the kernel module 122 himself, a plurality of instances of the kernel module 122 may be distributed by the server 110 side to the client 120, the plurality of instances corresponding to a plurality of candidate versions, which may also omit the code compilation system in the client 120; in order to meet the close-source requirement of the commercial operating system, these instances corresponding to the candidate versions may be encapsulated into binary codes before being distributed; in order to avoid the need to export the required API when plurality of kernel modules 122 refer to each other's APIs, the address of the required API may be found and stored each time when the corresponding symbol module is loaded. It will be appreciated that the above kernel 121 and kernel module 122 may be (but is not limited to) the kernel and kernel module of the Linux operating system or may be the kernel and kernel module of other operating systems, such as Mac OS X.

Figure 2:
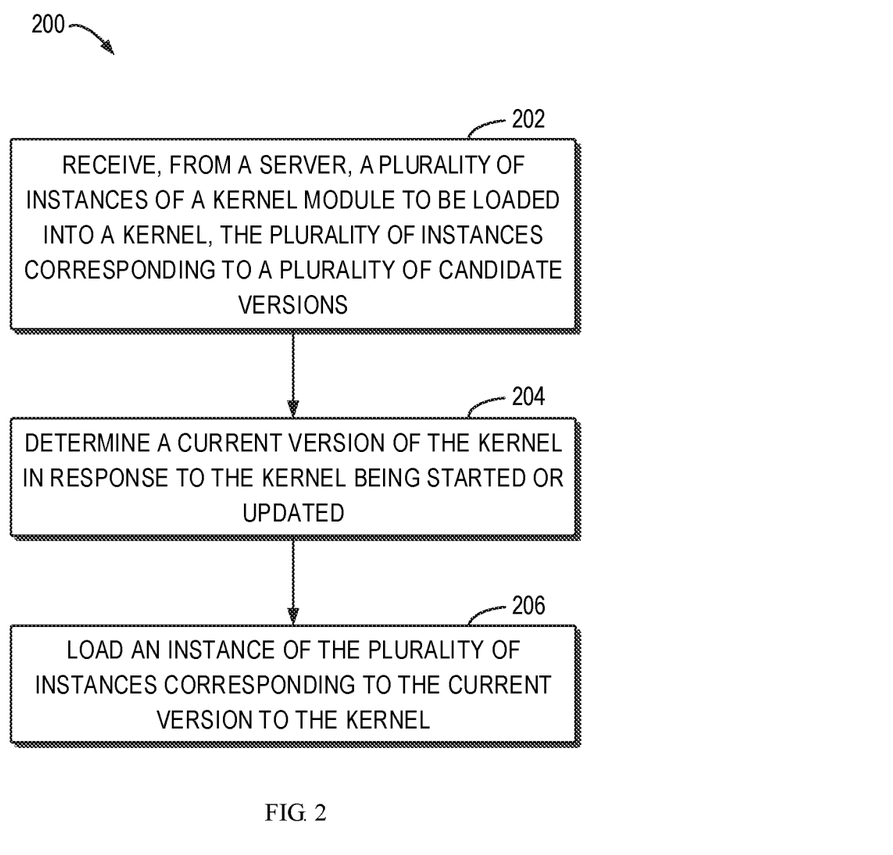
FIG. 2 illustrates a flowchart of a process or method for kernel management in accordance with embodiments of the present disclosure.

FIG. 2 illustrates a flowchart of a process or method 200 for managing a kernel 121 in accordance with embodiments of the present disclosure. In some embodiments, the method 200 may be implemented in the device shown in FIG. 7. As an example, method 200 may be implemented in the client 120 shown in FIG. 1. Now, reference is made to FIG. 1 to depict the process or method 200 for managing the kernel 121 according to embodiments of the present disclosure shown in FIG. 2. For ease of understanding, the specific data mentioned below are all illustrative, rather than for limiting scope of protection of the present disclosure.

At 202, a plurality of instances of the kernel module 122 to be loaded into the kernel 121 are received from server 110. The plurality of instances correspond to a plurality of candidate versions. In some embodiments it is possible to receive the plurality of instances for one kernel module 122 only from server 110. Alternatively or additionally, the plurality of groups of instances of a plurality of different kernel modules 122 may be received from the server 110. Further, in some embodiments, the server 110 may include a candidate version creating system (not shown) for creating a plurality of candidate versions of the kernel module 122 for a plurality of universal versions of the kernel 121. By distributing a plurality of candidate versions of the kernel module 122 by the server 110 side to the client 120, it is possible to prevent the user from writing source code of the kernel module 122 himself so as to improve the overall security of the operating system significantly. In addition, as the plurality of candidate versions are all created at the server 110 side, the code compilation system in the client 120 may be omitted, thereby releasing the computing and storage resources of the client 120.

At 204, when it is detected that the kernel 121 is started or updated, the current version of the updated kernel 121 is determined. In some embodiments, after the kernel 121 is updated, the current version of the kernel 121 may be determined directly. In some other embodiments, after the kernel 121 is started, the current version of the kernel 121 may be determined directly. Alternatively or additionally, there is no need to determine the current version of the kernel 121 after the kernel 121 is started, but rather when the kernel 121 is started. If it is found that the current version of kernel 121 is different from the previously recorded version, it is determined that the kernel 121 is updated, and the current version after updating is determined only when it is determined that the kernel is updated. It should be noted that the current version of the kernel 121 is mainly to determine if the kernel 121 has changed (updated), thereby facilitating the subsequent operation of dynamically loading the kernel module.

Figure 3:
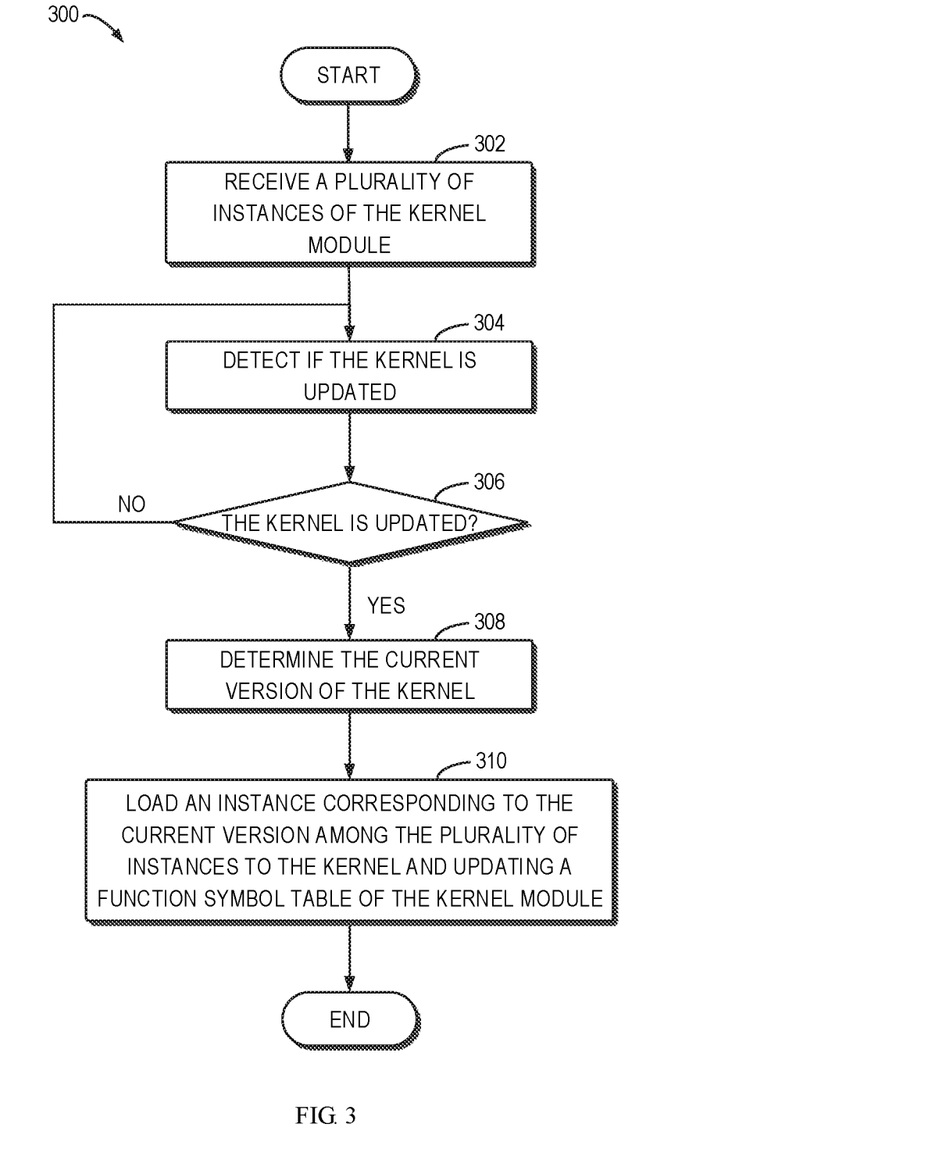
FIG. 3 illustrates a flowchart of a process or method for kernel management in accordance with embodiments of the present disclosure.

At 206, an instance of the plurality of instances corresponding to the current version is loaded to the kernel 122. In some embodiments, there are three candidate versions of the kernel module 122, namely, a first candidate version, a second candidate version and a third candidate version. As an example, the first candidate version of the kernel module 122 corresponds to a first universal version of the kernel 121, the second candidate version of the kernel module 122 corresponds to a second universal version of the kernel 121, and the third candidate version of the kernel module 122 corresponds to a third universal version of the kernel 121. When it is determined that the first universal version is, for instance, the current version of the kernel 121, the client 120 may load the kernel module 122 based on the first candidate version corresponding to the first universal version, thereby accomplishing dynamic loading of the kernel module 122. Reference will be made to FIG. 3 below to depict the specific operation of kernel management in greater detail.

FIG. 3 illustrates a flowchart of a process or method 300 for managing a kernel 121 in accordance with embodiments of the present disclosure. In some embodiments, the method 300 may be implemented in the device shown in FIG. 7. As an example, the method 300 is implemented in the client 120 shown in FIG. 1. Now, reference is made to FIG. 1 to depict the process or method 300 for managing the kernel 121 according to embodiments of the present disclosure shown in FIG. 3. For ease of understanding, the specific data mentioned below are illustrative, rather than for limiting the scope of protection of the present disclosure.

At 302, client 120 receives a plurality of instances of the kernel module 122 created by the server 110 side, the plurality of instances corresponding to a plurality of candidate versions. The embodiment of creating a plurality of instances of the kernel module 122 has been described with reference to FIG. 2, thus omitted here. At 304, it is detected if the kernel 121 is updated. At 306, if it is determined that the kernel 121 is updated, then at 308, the current version of the kernel 121 is determined; if it is determined that the kernel 121 is not updated, then return to 304 and continue to detect if the kernel is updated. Then, at 310, an instance corresponding the current version among the plurality of instances is loaded to the kernel 122 and API table of the kernel module 122 is updated. In other words, it is possible to find and store the required address of the API and store it in the API table each time when the corresponding symbol module is loaded, so as to avoid the need to export the required API when a plurality of kernel modules 122 refer to each other's API. In some embodiments, API table is stored in the kernel 122.

Figure 4:
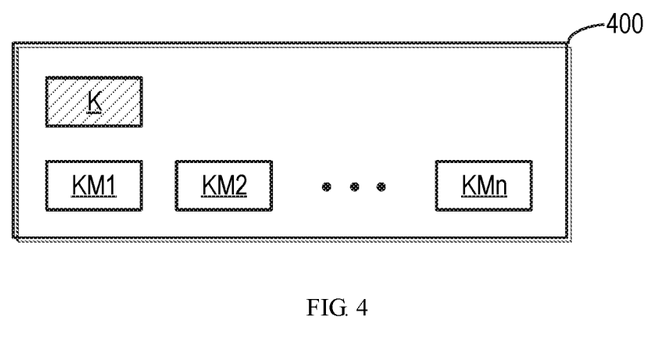
FIG. 4 illustrates a schematic diagram of an API table in accordance with embodiments of the present disclosure.

An embodiment for updating the API table is described in FIG. 4. API table will be depicted below with reference to FIG. 4. FIG. 4 illustrates a schematic diagram of an API table 400 in accordance with embodiments of the present disclosure. API generally refers to the function to be scheduled by the kernel 121 and the kernel module 122. The API table may include the address of the API used by the kernel module 122 in the kernel 121.

As shown in FIG. 4, API table 400 includes address K, in the kernel 121, of API of the kernel 121 and addresses KM1, KM2, . . . , KMn, in the kernel 121, of APIs of a plurality of different kernel modules 122. In some embodiments, when the kernel 121 is updated, the address K, in the kernel 121, of the API of the kernel 121 may be further updated. Then, when a kernel module 122 is loaded to the kernel 121, the address KM1, in the kernel 121, of the API of the kernel module may be updated. When another kernel module 122 is loaded to the kernel 121, the address, in the kernel 121, of the API of the kernel module may be further updated, for instance, KM2, and so on.

Because the address of the API required by the kernel module is updated to the API table when each kernel module is updated, when the kernel module is operated, even if APIs in other kernel modules are required, it is possible to look up the API table directly without the need to export the required APIs from other kernel modules. Further, as it is unnecessary to export APIs, APIs in each kernel module do not need to be exposed, thereby further meeting the close-source requirement of the commercial operating system.

In some embodiments, the above plurality of candidate versions from the server 110 are all encapsulated kernel module binary codes. Because the client 120 can only receive the encapsulated kernel module binary codes and cannot receive the source code of the kernel module, it can meet the close-source requirement of the commercial operating system.

Figure 5:
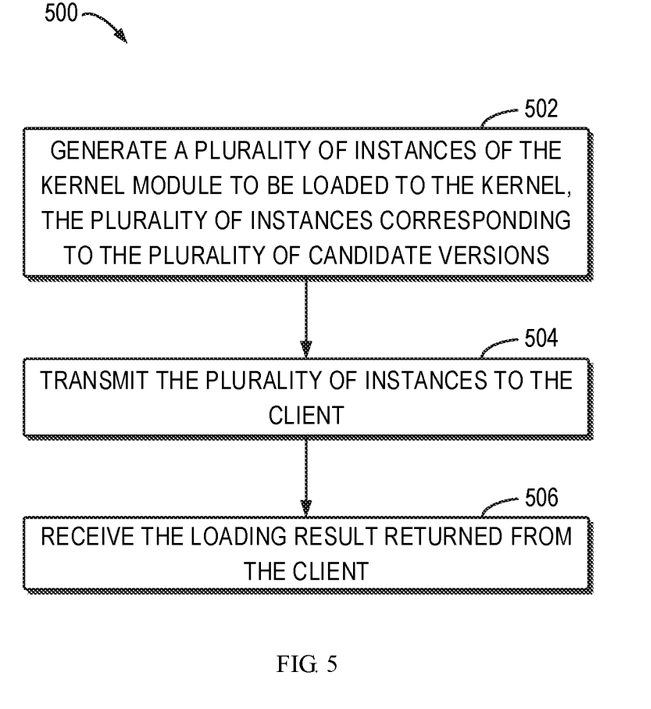
FIG. 5 illustrates a flowchart of a process or method for kernel management in accordance with embodiments of the present disclosure.

FIG. 5 illustrates a flowchart of a process or method 500 for kernel management in accordance with embodiments of the present disclosure. In some embodiments, the method 500 may be implemented in the device shown in FIG. 7. As an example, the method 500 may be implemented in the server 110 shown in FIG. 1. Now, reference is made to FIG. 1 to depict the process or method 500 for managing the kernel 121 according to embodiments of the present disclosure shown in FIG. 5. For ease of understanding, the specific data mentioned below are all illustrative, rather than for limiting the scope of protection of the present disclosure.

At 502, a plurality of instances of the kernel module 122 to be loaded into the kernel 121 are generated, where the plurality of instances correspond to a plurality of candidate versions. In some embodiments, it is possible to generate plurality of instances only for one kernel module 122. Alternatively or additionally, a plurality of groups of instances for different kernel modules 122 may be generated. Moreover, in some embodiments, the server 110 may include a candidate version creating system (not shown) for creating a plurality of candidate versions of the kernel module 122 for a plurality of universal versions of the kernel 121. As an example, the candidate version creating system may utilize a program architecture such as a dynamic kernel module support (DKMS) scheme to compile a plurality of versions of source code of the kernel module 122 automatically and encapsulate them into binary codes. Because the server 110 only distributes encapsulated kernel module binary codes to the client 120, rather than source codes of the kernel module, it can meet the close-source requirement of the commercial operating system.

At 504, the plurality of instances are transmitted to the client. By distributing the plurality of instances of the kernel module 122 by the server 110 side to the client 120, it is possible to prevent the user from writing the source code of the kernel module 122 himself, thereby improving the overall security of the operating system significantly. In addition, as the plurality of instances are all created at the server 110 side, the code compilation system in the client 120 can be omitted, thereby releasing the computing and storage resources of the client 120.

At 506, the loading result returned from the client is received.

Principles of the present disclosure will be illustrated below in general with reference to FIG. 6. The present disclosure is not limited to the example shown in FIG. 6.

Figure 6:
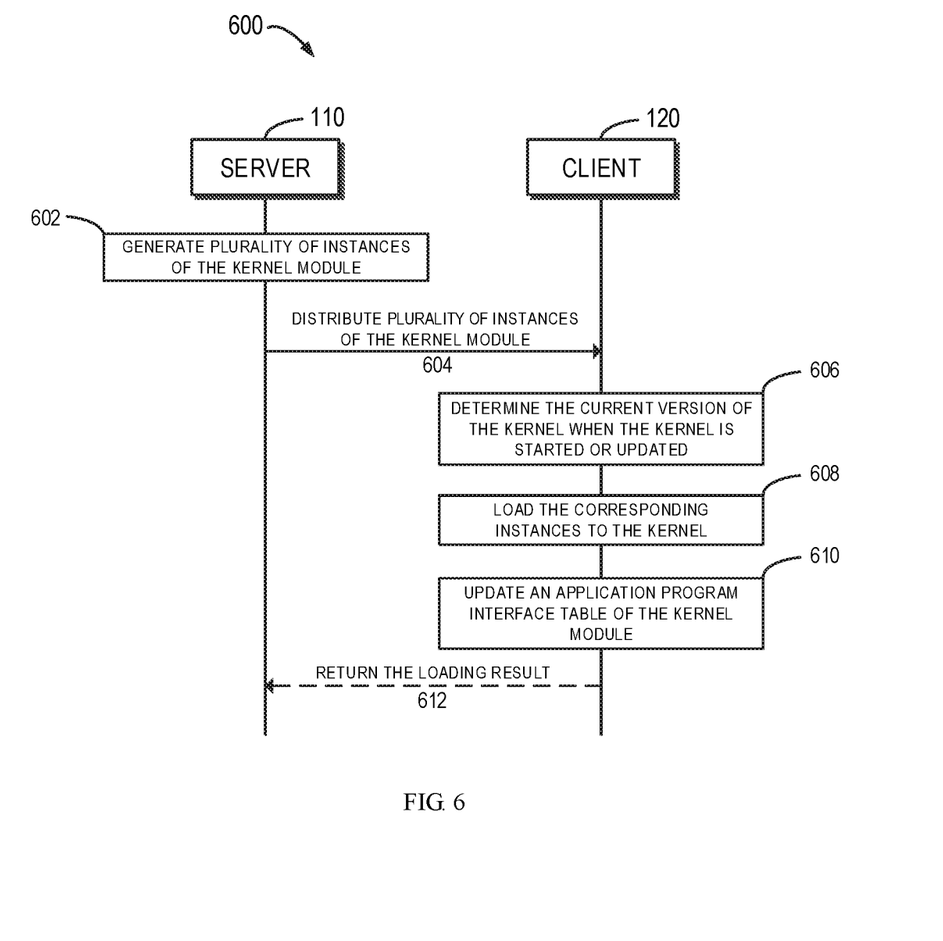
FIG. 6 illustrates a high-level pipeline diagram of kernel management in accordance with embodiments of the present disclosure.

FIG. 6 illustrates a high-level pipeline diagram of kernel management in accordance with embodiments of the present disclosure. At 602, the server 110 generates a plurality of candidate versions of the kernel module 122 to be loaded to the kernel 121 in the client 120. In some embodiments, the server 110 may further include candidate version creating system (not shown) for creating binary code for a plurality of candidate versions of the kernel module 122 for a plurality of universal versions of the kernel 121.

At 604, the server 110 distributes the generated plurality of instances corresponding to a plurality of candidate versions to the client 120. In some embodiments, these instances are all encapsulated into the binary code of the kernel module, a part or all of which are distributed to the corresponding position of the client 120 so as to be loaded directly when it is found that the kernel 121 is updated. As an example, it is possible to distribute the binary code to the folder position of the client 120: /lib/modules/<kernel_release>. It will be appreciated that the binary code may also be stored in other folder positions that are easy to be found.

At 606, at the client 120 side, when it is found that kernel 121 is started or is updated, the current version of the kernel 121 is determined. At 608, the corresponding instances are loaded to the kernel 122. At 610, the API table of the kernel module is updated. At 612, the loading result is returned.

Since a plurality of instances of the kernel module 122 are all distributed by the server 110 side to the client 120, the user is prevented from writing the source code of the kernel module 122 himself, thereby improving the security of the system and omitting the code compilation system in the client 120. Further, because these instances will be encapsulated as binary code before being distributed, the source code of the kernel module is not available at the client 120 side, thus meeting the close-source requirement of the commercial operating system. Moreover, as the address of the required API is found and stored each time when the corresponding symbol module is loaded, it is possible to avoid exporting the required API when a plurality of kernel modules 122 refer to each other's API, thereby optimizing the process flow, and further meeting the close-source requirement of the commercial operating system.

Figure 7:
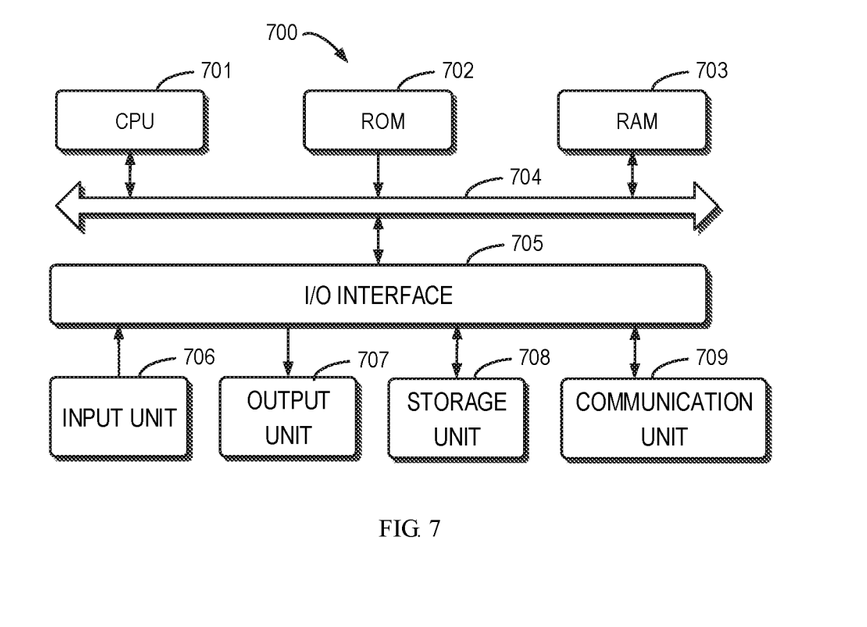
FIG. 7 illustrates a schematic block diagram of a device for kernel management in accordance with embodiments of the present disclosure.

FIG. 7 illustrates a schematic block diagram of an example device 700 that may be used to implement embodiments of the present disclosure. As illustrated, the device 700 includes a central processing unit (CPU) 701 which may perform various appropriate actions and processing based on the computer program instructions stored in a read-only memory (ROM) 702 or the computer program instructions loaded from a storage unit 708 into a random access memory (RAM) 703. The RAM 703 also stores all kinds of programs and data required by operating the storage device 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing as described above, such as the method 200, 300 and/or 500, may be executed by the processing unit 701. As an example, in some embodiments, the method 200, 300 and/or 500 can be implemented as computer software programs, which are tangibly included in a machine-readable medium, such as the storage unit 708. In some embodiments, the computer program may be partially or completely loaded and/or installed to the device 700 via the ROM 702 and/or the communication unit 709. When the computer program is loaded to the RAM 703 and executed by the CPU 701, one or more acts of the above described method 200, 300 and/or 500 are implemented.

The present disclosure may be a method, an apparatus, a system, and/or a computer program product. The computer program product may include a computer readable storage medium (or media) loaded with computer readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of a method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of kernel management, comprising:
   receiving, from a server, a plurality of instances of a kernel module to be loaded into a kernel, the plurality of instances corresponding to a plurality of candidate versions of the kernel, wherein the plurality of candidate versions comprises a current version of the kernel;
   determining the current version of the kernel in response to the kernel being started or updated; and
   loading, to the kernel, an instance of the plurality of instances corresponding to the current version, wherein the loading comprises updating an application programming interface (API) table of the instance, the API table comprising an address, in the kernel, of an API used by the instance.

2. The method according to Claim 1, wherein the API table further comprises a second address, in the kernel, of a second API used by a second kernel module loaded to the kernel.

3. The method according to claim 1, wherein the plurality of candidate versions correspond to a plurality of universal versions of the kernel.

4. The method according to claim 1, wherein the plurality of candidate versions are each encapsulated in a binary code.

5. An electronic device, comprising:
   at least one central processing unit; and
   at least one memory coupled to the at least one central processing unit and storing machine-executable instructions, the instructions, when executed by the at least one central processing unit, causing the electronic device to perform a method, the method, comprising:
   receiving, from a server, a plurality of instances of a kernel module to be loaded into a kernel, the plurality of instances corresponding to a plurality of candidate versions of the kernel, wherein the plurality of candidate versions comprises a current version of the kernel;
   determining the current version of the kernel in response to the kernel being started or updated; and
   loading an instance of the plurality of instances corresponding to the current version to the kernel, wherein the loading comprises updating an application programming interface (API) table of the instance, the API table comprising an address, in the kernel, of an API used by the instance.

6. The electronic device according to Claim 5, wherein the API table further a second address, in the kernel, of a second API used by a second kernel module loaded to the kernel.

7. The electronic device according to claim 5, wherein the plurality of candidate versions correspond to a plurality of universal versions of the kernel.

8. The electronic device according to claim 5, wherein the plurality of candidate versions are each encapsulated kernel module binary codes respectively.

9. A computer program product tangibly stored on a non-transient computer readable medium and including machine executable instructions which, when executed, cause the machine to perform a method, the method comprising:
   receiving, from a server, a plurality of instances of a kernel module to be loaded into a kernel, the plurality of instances corresponding to a plurality of candidate versions of the kernel, wherein the plurality of candidate versions comprises a current version of the kernel;
   determining the current version of the kernel in response to the kernel being started or updated; and loading, to the kernel, an instance of the plurality of instances corresponding to the current version, wherein the loading comprises updating an application programming interface (API) table of the instance, the API table comprising an address, in the kernel, of an API used by the instance.

10. The computer program product according to claim 9, wherein the API table further comprises a second address, in the kernel, of a second API used by a second kernel module loaded to the kernel.

11. The computer program product according to claim 9, wherein the plurality of candidate versions correspond to a plurality of universal versions of the kernel.

12. The computer program product according to claim 9, wherein the plurality of candidate versions are each encapsulated in a binary code.

* * * * *

UNITED STATES PATENT AND TRADEMARK OFFICE
CERTIFICATE OF CORRECTION

PATENT NO. : 10,592,257 B2
APPLICATION NO. : 16/119313
DATED : March 17, 2020
INVENTOR(S) : Yizhou Zhou and Zhibin Zhang Page 1 of 1

It is certified that error appears in the above-identified patent and that said Letters Patent is hereby corrected as shown below:

In the Claims

Column 10, Line 48, in Claim 6, the phrase "further a second address" should read -- further comprises a second address --.

Signed and Sealed this
Second Day of June, 2020

Andrei Iancu
*Director of the United States Patent and Trademark Office*